(12) United States Patent
Jang et al.

(10) Patent No.: US 11,225,749 B2
(45) Date of Patent: Jan. 18, 2022

(54) DIRECT DRIVING APPARATUS FOR WASHING MACHINE

(71) Applicant: NEW MOTECH CO., LTD., Gwangju (KR)

(72) Inventors: Jeong Cheol Jang, Gwangju (KR); Wang Gyu Jeong, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 176 days.

(21) Appl. No.: 16/491,154

(22) PCT Filed: Mar. 15, 2018

(86) PCT No.: PCT/KR2018/003036
§ 371 (c)(1),
(2) Date: Sep. 4, 2019

(87) PCT Pub. No.: WO2018/208003
PCT Pub. Date: Nov. 15, 2018

(65) Prior Publication Data
US 2020/0010998 A1      Jan. 9, 2020

(30) Foreign Application Priority Data
May 12, 2017   (KR) .......................... 10-2017-0059452

(51) Int. Cl.
| | | |
|---|---|---|
| *D06F 37/36* | (2006.01) |
| *H02K 1/27* | (2006.01) |
| *H02K 7/116* | (2006.01) |
| *D06F 37/30* | (2020.01) |

(52) U.S. Cl.
CPC .............. *D06F 37/36* (2013.01); *D06F 37/30* (2013.01); *D06F 37/304* (2013.01); *H02K 1/274* (2013.01); *H02K 7/116* (2013.01)

(58) Field of Classification Search
CPC ....................................................... D06F 37/36
See application file for complete search history.

(56) References Cited

U.S. PATENT DOCUMENTS

| | | |
|---|---|---|
| 5,887,458 A | 3/1999 | Bae |
| 2006/0101864 A1 | 5/2006 | Namkung et al. |
| 2007/0138902 A1 | 6/2007 | Ahn et al. |

FOREIGN PATENT DOCUMENTS

| | | |
|---|---|---|
| JP | 2015-208501 A | 11/2015 |
| KR | 10-1998-082929 A | 12/1998 |
| KR | 10-2002-0058548 A | 7/2002 |
| KR | 10-2004-0065839 A | 7/2004 |
| KR | 10-2004-0071404 A | 8/2004 |
| KR | 10-2004-0071417 A | 8/2004 |
| KR | 10-2005-0080758 A | 8/2005 |
| KR | 10-2006-0058481 A | 5/2006 |
| KR | 10-2007-0010031 A | 1/2007 |

(Continued)

OTHER PUBLICATIONS

International Search Report for PCT/KR2018/003036 dated Jun. 28, 2018 from Korean Intellectual Property Office.

*Primary Examiner* — Jason Y Ko
(74) *Attorney, Agent, or Firm* — Revolution IP, PLLC

(57) ABSTRACT

A direct driving apparatus for a washing machine according to the present invention, capable of deceleration driving, includes a tub, a stator assembly coupled to the tub and a rotor assembly positioned outside the stator assembly, wherein the apparatus further includes a deceleration coupling unit positioned in a central space of the stator assembly.

9 Claims, 16 Drawing Sheets

(56) References Cited

FOREIGN PATENT DOCUMENTS

| KR | 10-2013-0091589 A | 8/2013 |
| KR | 10-2015-0009345 A | 1/2015 |
| KR | 10-1603210 B1 | 3/2016 |

[Fig. 1]
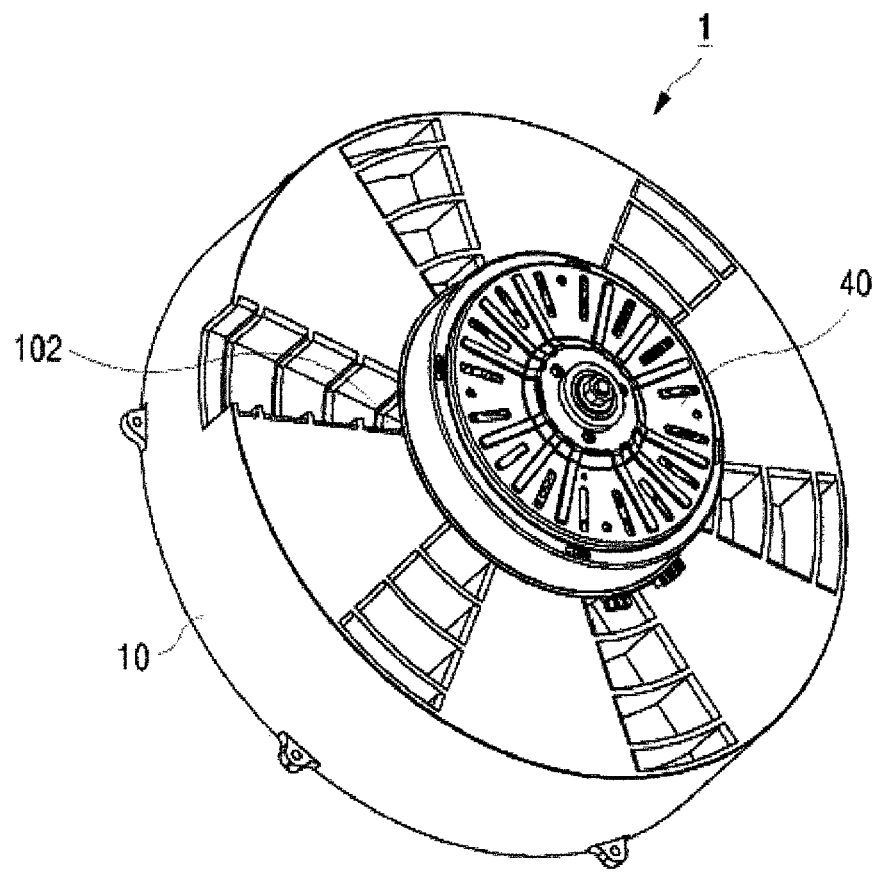

[Fig. 2]
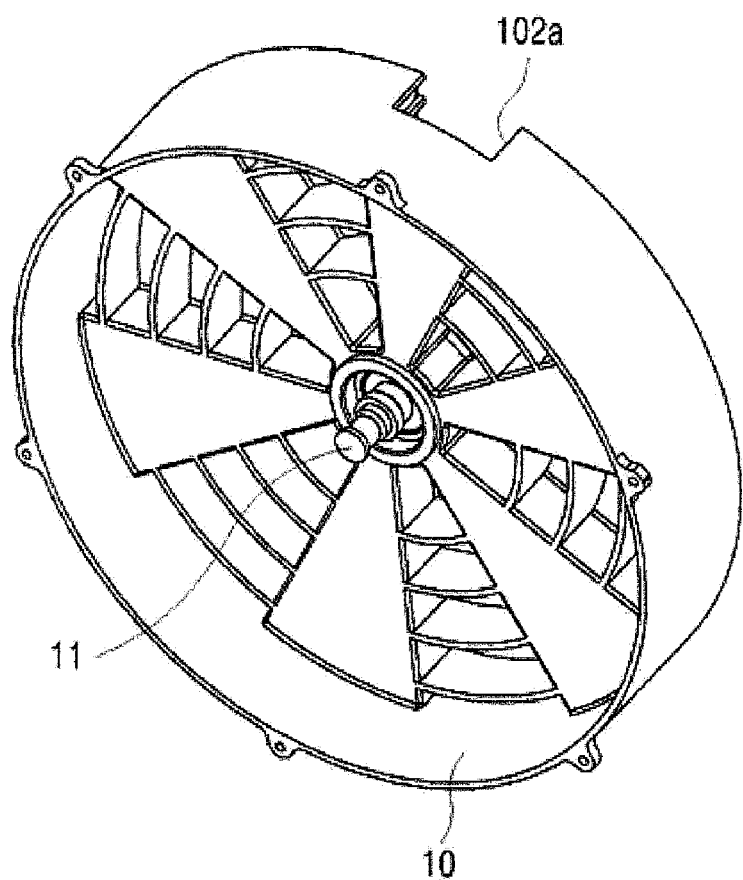

[Fig. 3]
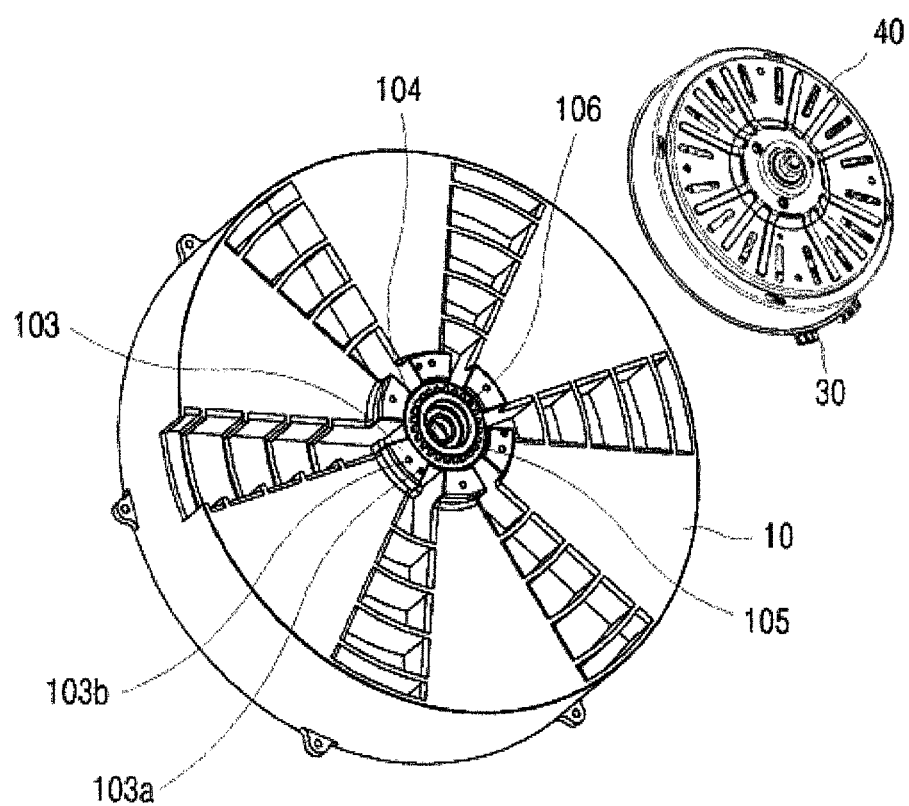

[Fig. 4]
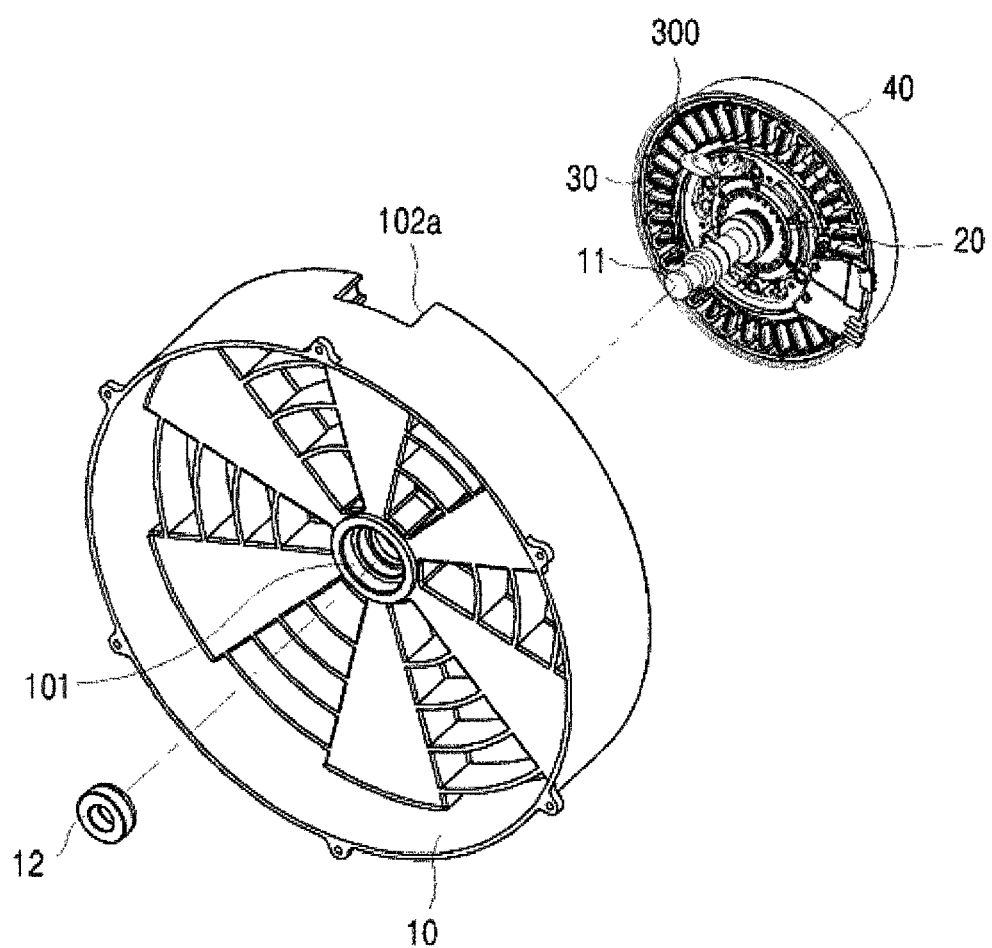

[Fig. 5]
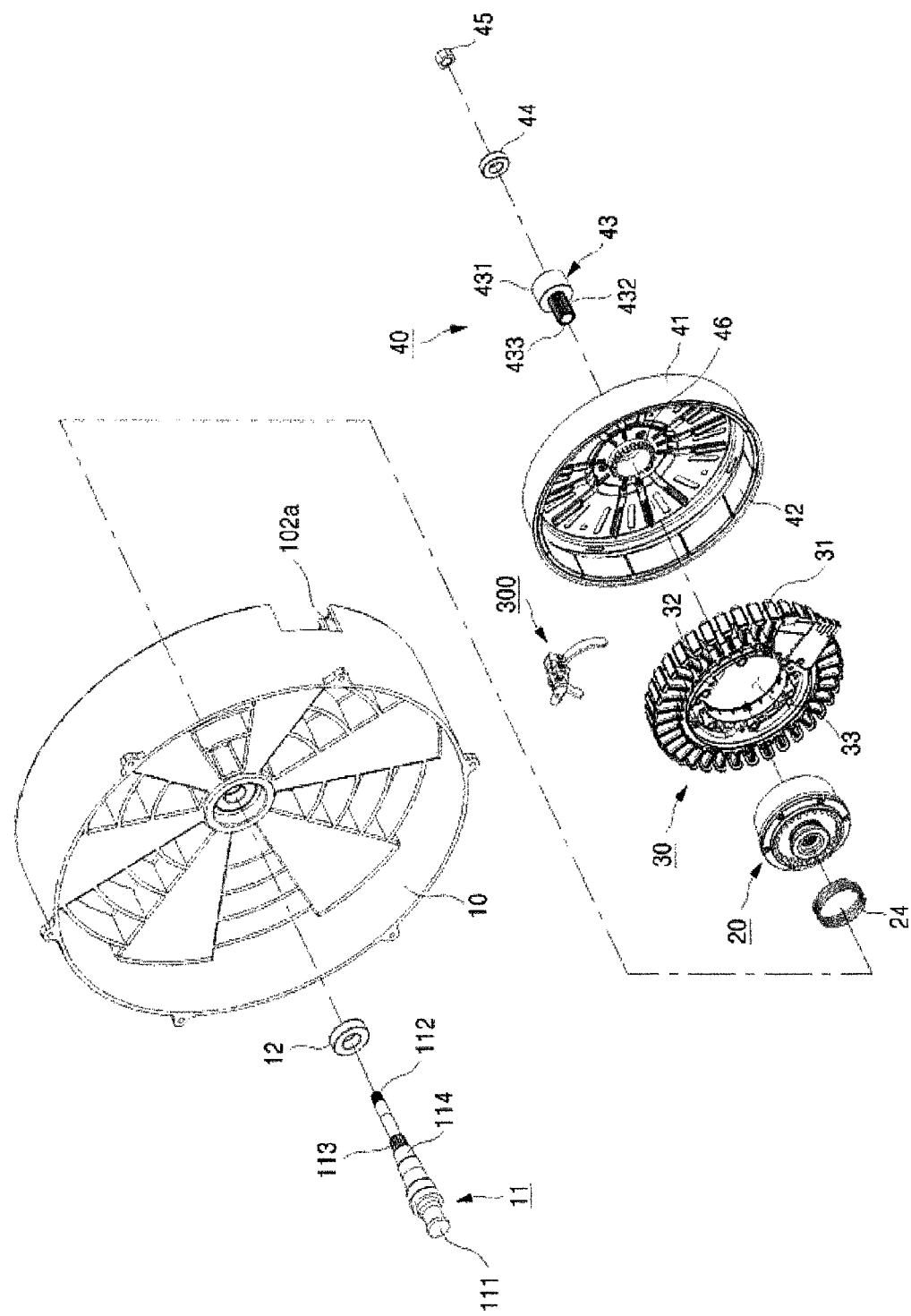

[Fig. 6]
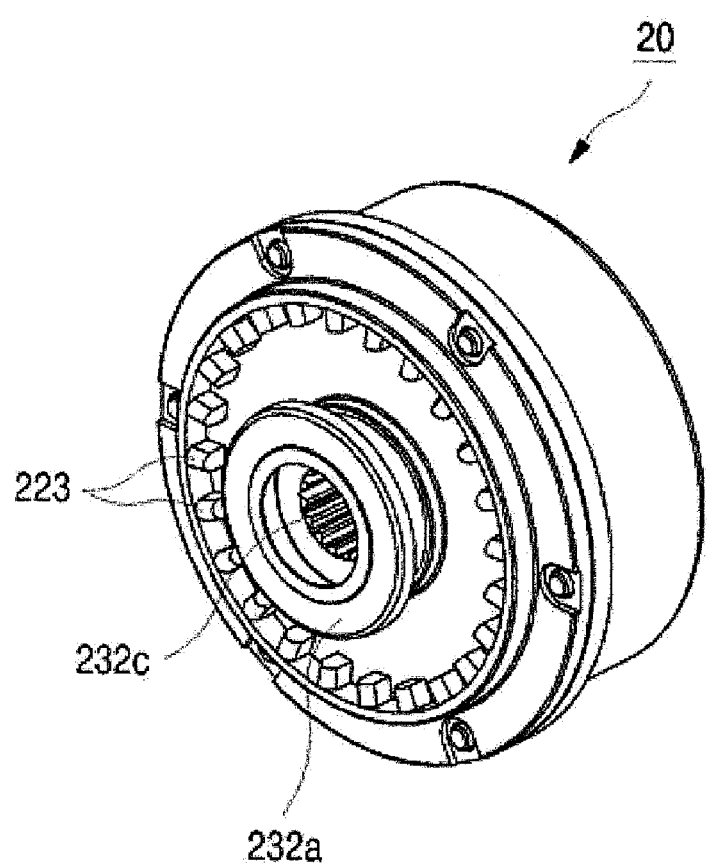

[Fig. 7]
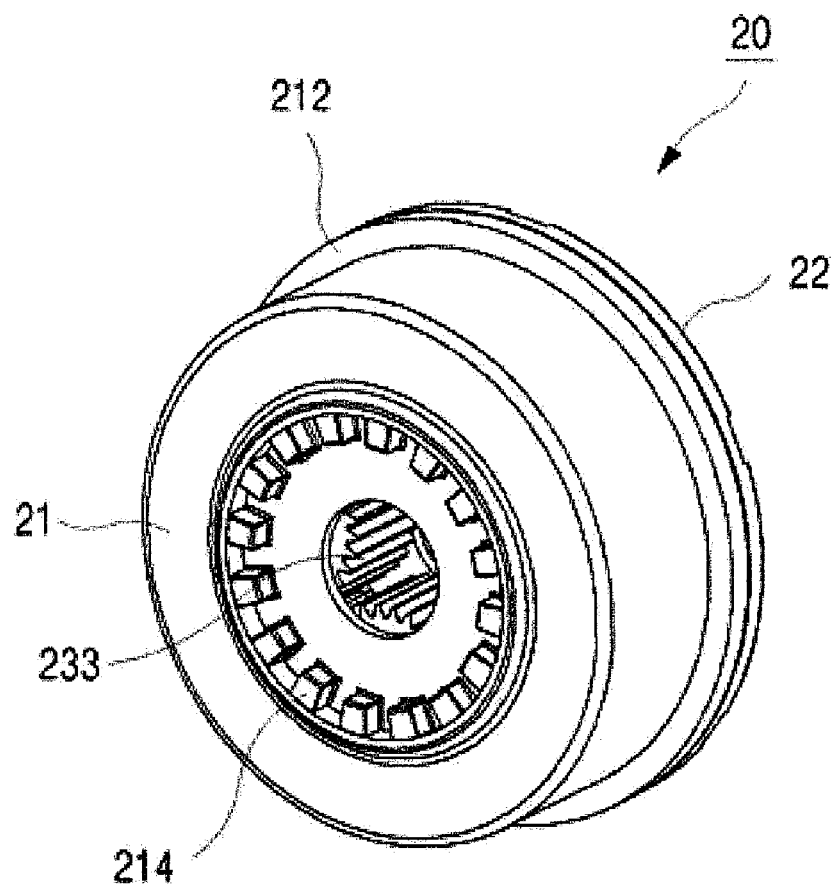

[Fig. 8]
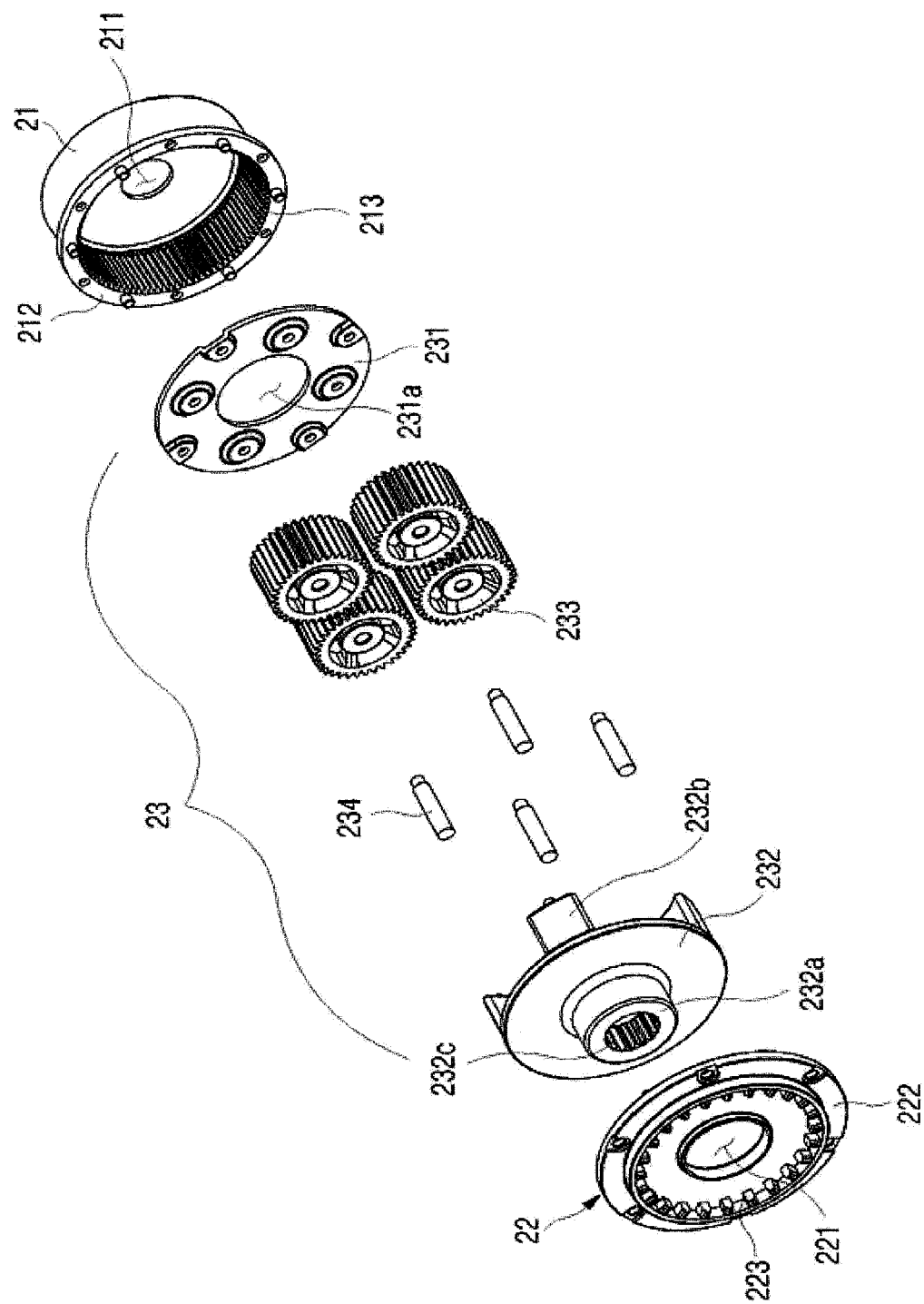

[Fig. 9]
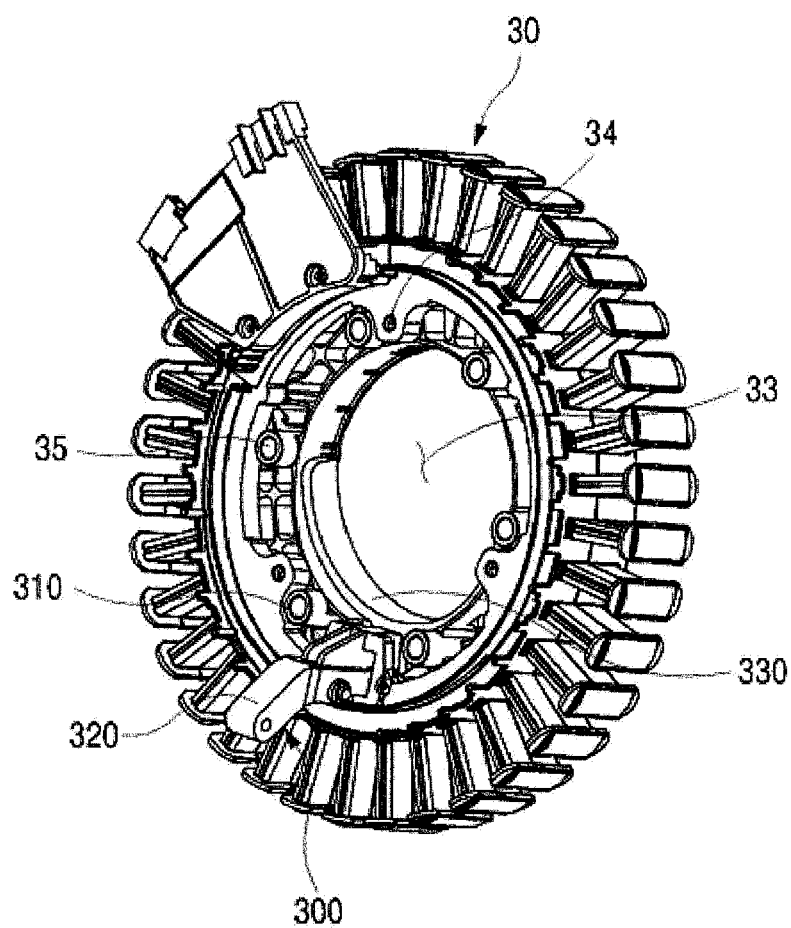

[Fig. 10]
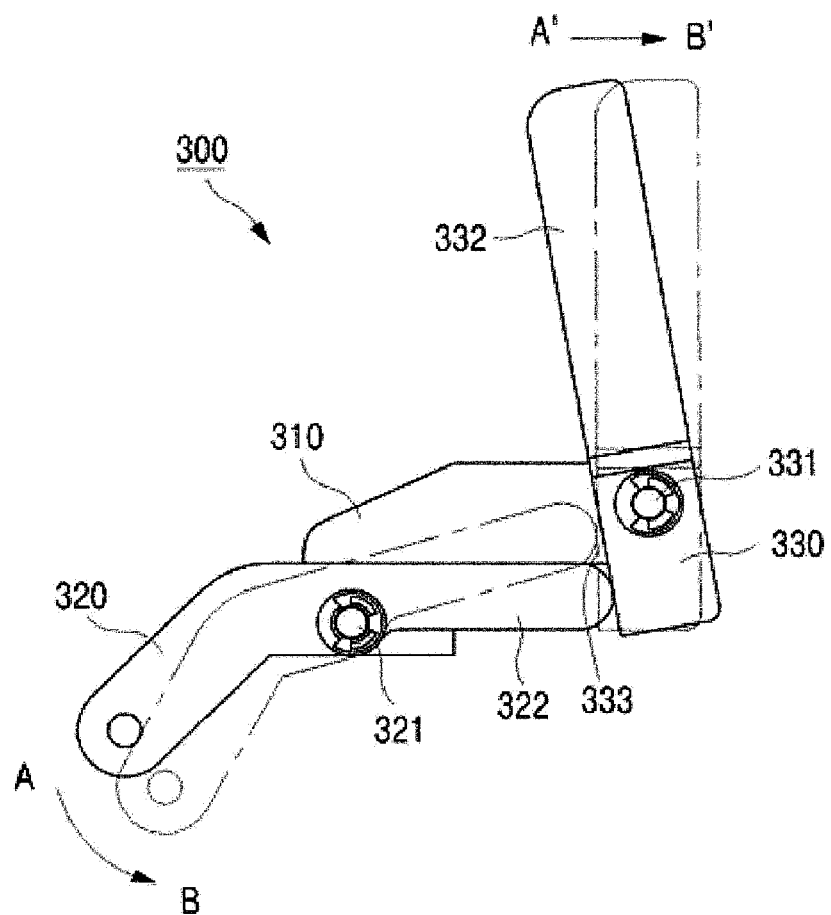

[Fig. 11]
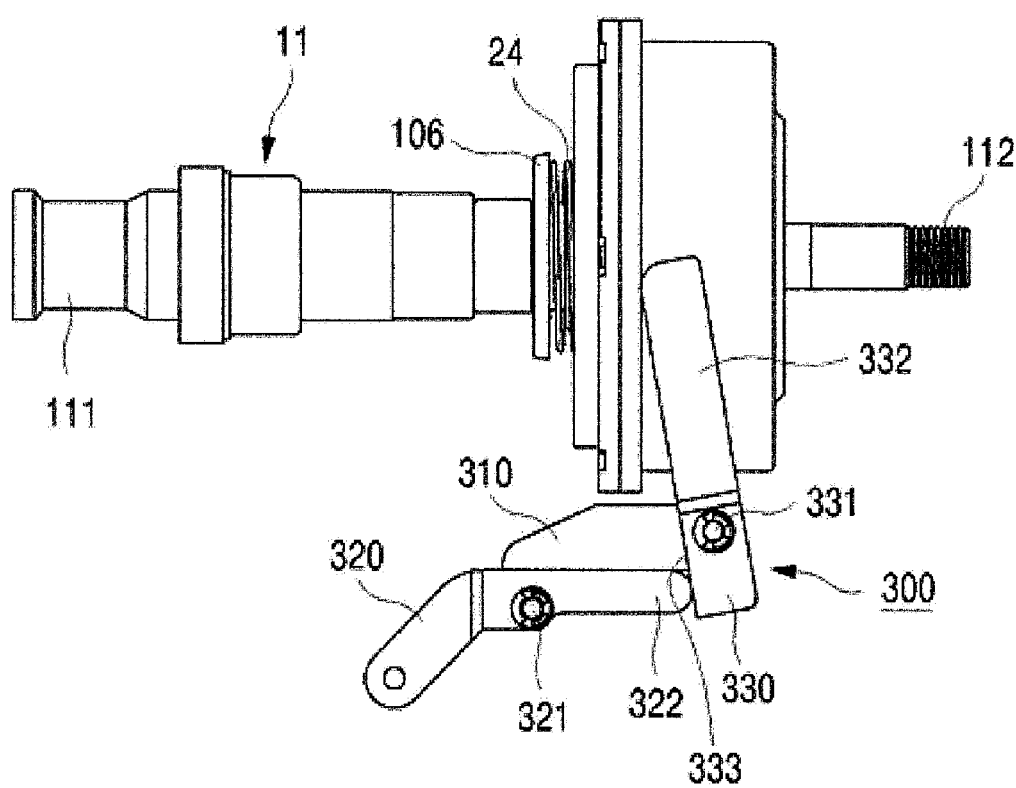

[Fig. 12]
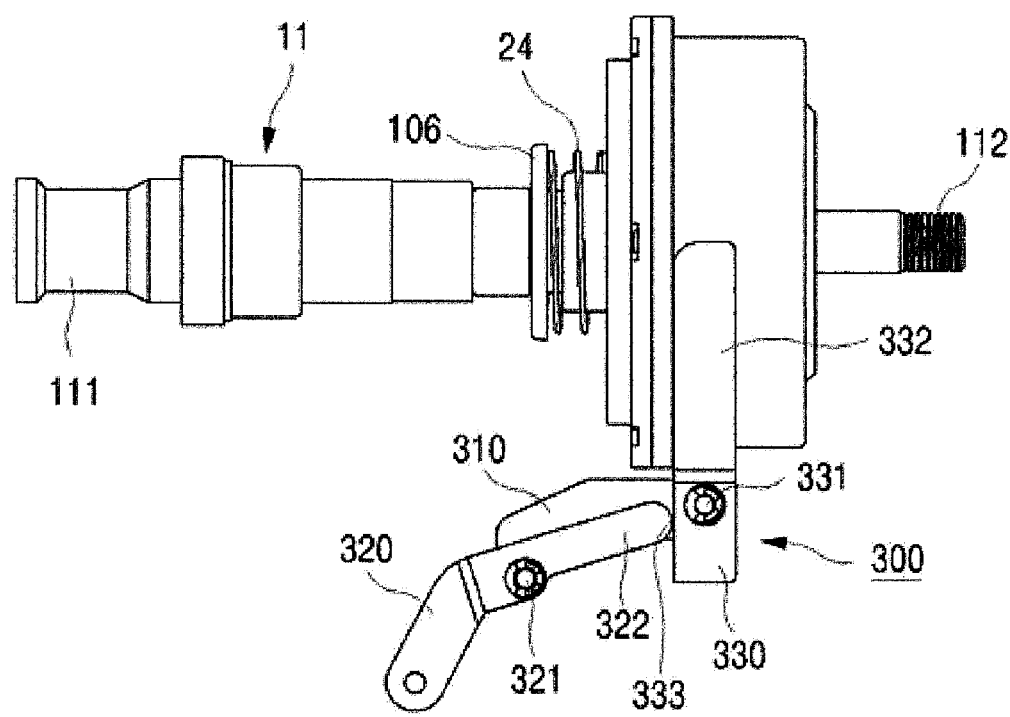

[Fig. 13]
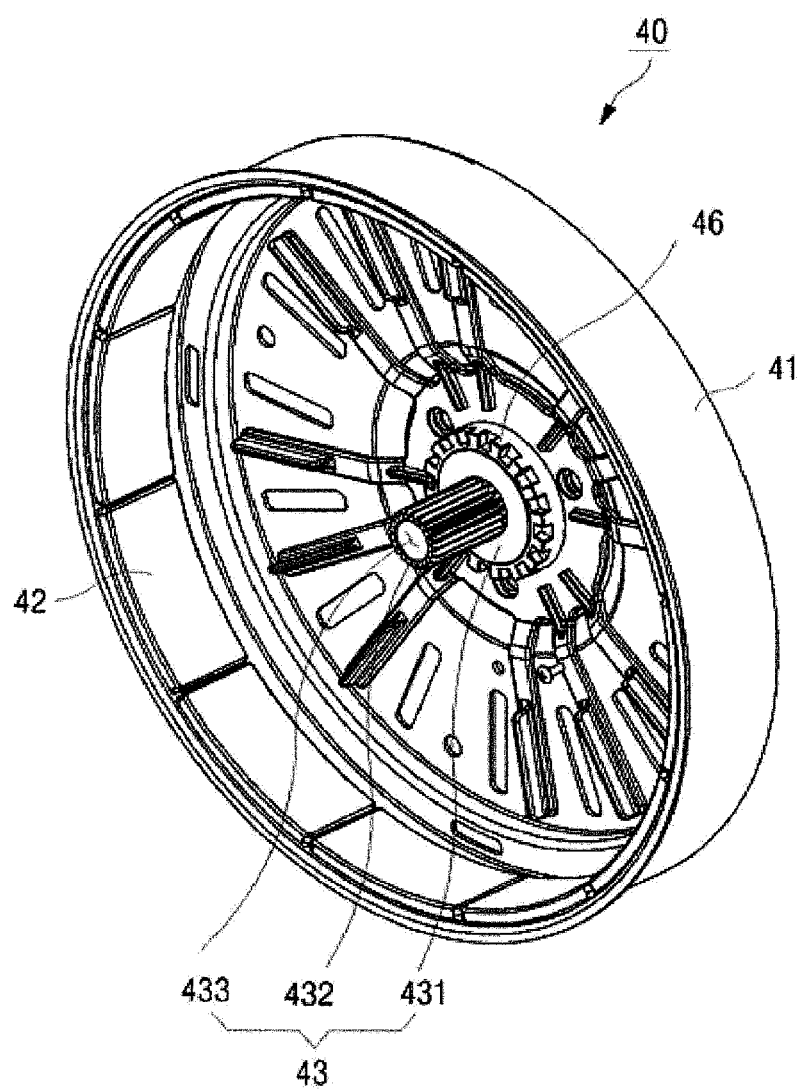

[Fig. 14]
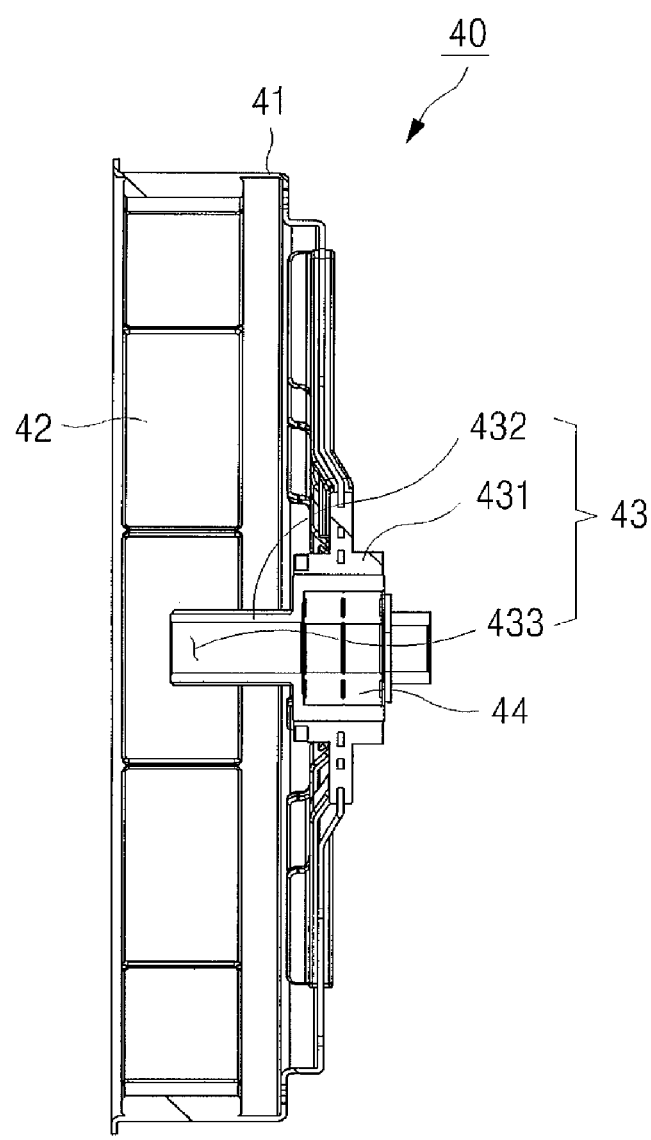

[Fig. 15]
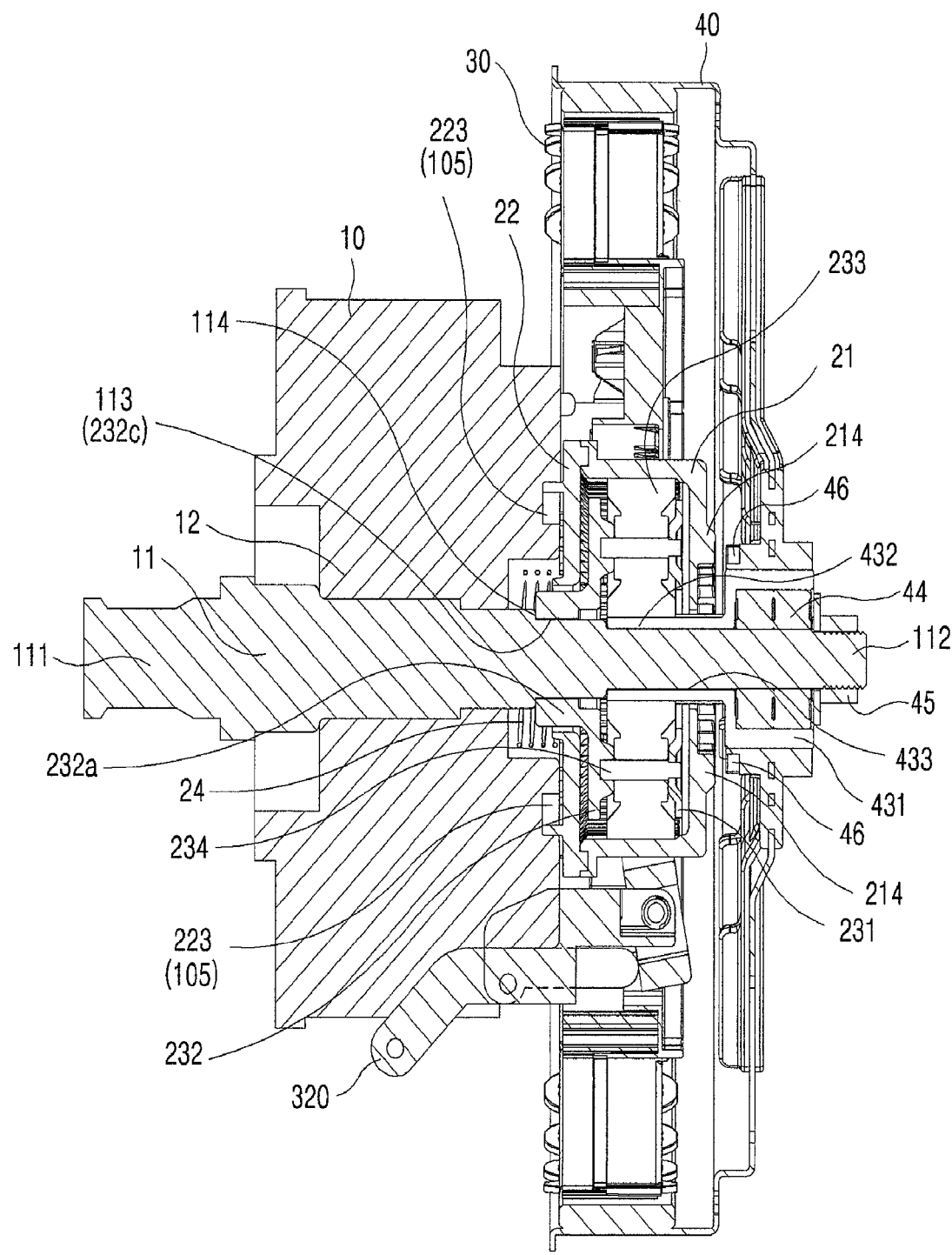

[Fig. 16]
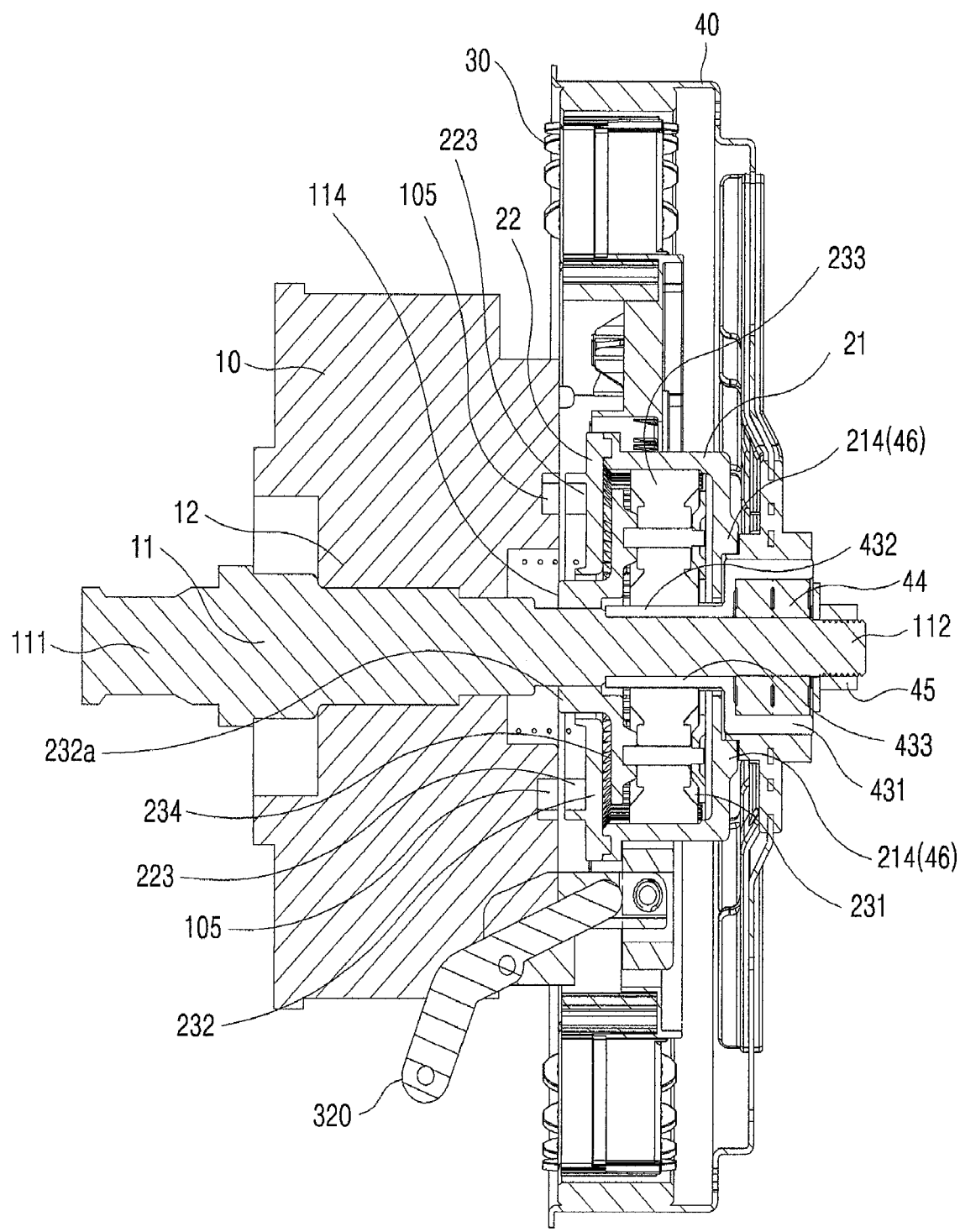

DIRECT DRIVING APPARATUS FOR WASHING MACHINE

TECHNICAL FIELD

The present invention relates to a driving apparatus for a washing machine. More specifically, the present invention relates to a novel driving apparatus for a washing machine, capable of driving by decelerating the rotation of a motor in a direct driving apparatus for a washing machine.

BACKGROUND ART

In general, the washing machine is classified into a pulsator type washing machine and a drum type washing machine. A pulsator type washing machine and a drum type washing machine are driven in different ways. For example, the driving apparatus used for a pulsator type washing machine is disclosed in Korean Patent No. 10-1603210 and Korean Patent Laid-open Nos. 10-2004-0071404 and 10-2004-0071417; and the driving apparatus used for a drum type washing machine is disclosed in Korean Patent Laid-open Nos. 10-2017-0010031, 10-2015-0009345 and 10-2013-0091589.

In the case of a pulsator type washing machine, a washing tub is fixed, and a pulsator installed in the center of the washing tub rotates so as to generate the flow of water in the washing or rinsing mode and wash or rinse laundry. The pulsator is rotated by a washing shaft. The pulsator is to be rotated at low speed and high torque in the washing and rinsing mode, while the washing tub is to be rotated at high speed and low torque in the dewatering mode. To this end, the pulsator type washing machine has a decelerator for controlling the rotation speed and torque of a motor, and the decelerator is operated by a clutch.

In the case of a drum type washing machine, a direct driving apparatus is widely used, in which a motor is fixed to a tub, and a washing tub (drum) installed in the tub is connected directly to the motor, thereby rotating the washing tub by rotation of the motor. In the direct driving apparatus, the rotation speed of the motor is controlled to provide the RPM required for washing, rinsing and dewatering modes.

Since the rotation shaft of the motor directly rotates the washing tub in the direct driving apparatus, the operation of the motor in the washing or rinsing mode at a low speed becomes inefficient. However, it is difficult to apply a clutch or decelerating device used for the pulsator type washing machine because of the structural characteristics or limitations of the drum type washing machine and direct driving apparatus.

Accordingly, the present inventors suggest a driving apparatus for a washing machine of a new structure in which a decelerator is applied to a direct driving apparatus, in order to solve the above-mentioned problems.

DISCLOSURE OF INVENTION

Technical Problem

It is an object of the present invention to provide a driving apparatus for a washing machine of a new structure.

It is another object of the present invention to provide a driving apparatus for a washing machine with high driving efficiency by applying the structure of a decelerator to the driving apparatus of a drum type washing machine.

It is an object of the present invention to provide a driving apparatus for a washing machine of a new structure.

It is another object of the present invention to provide a driving apparatus for a washing machine with high driving efficiency by applying the structure of a decelerator to the driving apparatus of a drum type washing machine.

The objects above of the present invention and other objects included therein may be easily achieved by the present invention explained in the following.

Solution to Problem

A direct driving apparatus for a washing machine according to the present invention, capable of deceleration driving, includes a tub, a stator assembly coupled to the tub and a rotor assembly positioned outside the stator assembly, wherein the apparatus further includes a deceleration coupling unit positioned in a central space of the stator assembly.

According to the present invention, it is preferable that the deceleration coupling unit includes a carrier, wherein the carrier has a plurality of planetary gears installed therein and includes a shaft receiver having a carrier spline on the inside.

According to the present invention, it is preferable that the driving apparatus for a washing machine further includes a shaft penetrating the carrier and rotor assembly, wherein the shaft has a shaft spline formed in a position fitting into the carrier spline.

According to the present invention, the deceleration coupling unit may further include a coupling housing receiving the carrier inside and having an inner gear engaged with the outer portions of the plurality of planetary gears.

According to the present invention, it is preferable that a lever unit is coupled to an insulator of the stator assembly such that the lever unit moves the coupling housing frontward or rearward.

According to the present invention, it is preferable that the shaft penetrates through a shaft penetration of a sun gear protruding frontward in the rotor assembly.

According to the present invention, it is preferable that the sun gear has an outer shape to be engaged with the inner portions of the plurality of planetary gears.

Advantageous Effects of Invention

The present invention has the effect of providing a driving apparatus for a washing machine capable of utilizing the optimal deceleration ratio in a washing or rinsing mode by applying the structure of a decelerator to a direct driving apparatus of a washing machine, thereby maximizing energy efficiency.

BRIEF DESCRIPTION OF DRAWINGS

FIG. 1 is a rear perspective view illustrating the driving apparatus for a washing machine according to the present invention;

FIG. 2 is a front perspective view illustrating the driving apparatus for a washing machine according to the present invention;

FIG. 3 is a rear perspective view illustrating the tub separated from the driving apparatus for a washing machine according to the present invention;

FIG. 4 is a front perspective view illustrating the tub separated from the driving apparatus for a washing machine according to the present invention;

FIG. 5 is an exploded perspective view illustrating the driving apparatus for a washing machine according to the present invention;

FIG. 6 is a front perspective view illustrating the deceleration coupling unit of the driving apparatus for a washing machine according to the present invention;

FIG. 7 is a rear perspective view illustrating the deceleration coupling unit of the driving apparatus for a washing machine according to the present invention;

FIG. 8 is an exploded perspective view illustrating the deceleration coupling unit of the driving apparatus for a washing machine according to the present invention;

FIG. 9 is a perspective view illustrating the stator assembly of the driving apparatus for a washing machine according to the present invention;

FIG. 10 is a side view illustrating the principle of operating the lever unit of the driving apparatus for a washing machine according to the present invention;

FIG. 11 is a side view illustrating the operation of the lever unit and deceleration coupling unit of the driving apparatus for a washing machine according to the present invention in a washing or rinsing mode;

FIG. 12 is a side view illustrating the operation of the lever unit and deceleration coupling unit of the driving apparatus for a washing machine according to the present invention in a dewatering mode;

FIG. 13 is a perspective view illustrating the rotor assembly of the driving apparatus for a washing machine according to the present invention;

FIG. 14 is a cross-sectional view illustrating the rotor assembly of the driving apparatus for a washing machine according to the present invention;

FIG. 15 is a cross-sectional view illustrating the structure when the driving apparatus for a washing machine according to the present invention operates in a washing or rinsing mode; and FIG. 16 is a cross-sectional view illustrating the structure when the driving apparatus for a washing machine according to the present invention operates in a dewatering mode.

Hereinafter, the present invention will be described in detail with reference to the accompanying drawings.

MODE FOR THE INVENTION

FIG. 1 is a rear perspective view illustrating the driving apparatus 1 for a washing machine according to the present invention, FIG. 2 is a front perspective view illustrating the driving apparatus 1, FIG. 3 is a rear perspective view illustrating the tub 10 separated from the driving apparatus 1 for a washing machine according to the present invention, and FIG. 4 is a front perspective view illustrating the tub 10.

As illustrated in FIG. 1 to FIG. 4, the driving apparatus 1 for a washing machine according to the present invention includes a tub 10, a deceleration coupling unit 20, a stator assembly 30 and a rotor assembly 40.

The tub 10 is fixedly installed in the body (or cabinet) (not illustrated) of a washing machine. The end of a shaft 11 is positioned by penetrating the center of the tub 10 frontward. For reference, the terms "front/frontward" and "rear/rearward" as used herein refer to directions towards the tub 10 and the rotor assembly 40, respectively, with respect to the positions of the tub 10 and rotor assembly 40.

The shaft 11 is rotated by the rotation driving force of a motor transmitted through the deceleration coupling unit 20. For reference, the term "motor" as used herein denotes the stator assembly 30 and rotor assembly 40 together. As illustrated in FIG. 4, the deceleration coupling unit 20 is positioned in the stator assembly 30, the rotation of the rotor assembly 40 allows the deceleration coupling unit 20 to rotate, and the rotation of the deceleration coupling unit 20 causes the shaft 11 to rotate. The deceleration coupling unit 20 is switched between a normal operating mode and a deceleration operating mode by operation of a lever unit 300. In the normal operating mode, the rotation speed of the rotor assembly 40 is the same as the rotation speed of the shaft 11, and accordingly a dewatering mode at a high speed is applied. In the deceleration operating mode, the rotation speed of the rotor assembly 40 is slower than the rotation speed of the shaft 11, and accordingly a washing or rinsing mode at a low speed is applied.

A washing tub (or drum) (not illustrated) coupled to the end of the shaft 11 is positioned in front of the tub 10 thereinside. A tub bearing insert 101 is formed in the front side of the center of the tub 10. A tub bearing 12 coupled to the tub bearing insert 101 supports the rotation of the shaft 11. A lever unit positioning space 102 is formed radially outward from the center in the rear of the tub 10, and the space extends to an opening 102a in the lateral surface of the tub. A first lever 320 of the lever unit 300 is positioned in the lever unit positioning space 102. The first lever 320 may be connected with a drain valve motor (not illustrated) installed in one side of the tub by a separate wire (not illustrated), etc., extending through the lever unit positioning space 102 and opening 102a. The drain valve motor can control a drain valve and also control the operation of the lever unit 300.

Referring to FIG. 3, a motor coupling 103 is protrudingly formed in the center of the rear of the tub 10 to couple the stator assembly 30. A plurality of arranging protrusions 103a and coupling holes 103b are formed in the motor coupling 103. The arranging protrusion 103a is coupled to an arranging hole 34 in the stator assembly 30 such that the stator assembly 30 is positioned in the tub 10 at the correct position. The coupling hole 103b communicates with a coupling hole 35 formed in the stator assembly 30 such that the stator assembly 30 is coupled to the tub 10 by a separate fastening means such as a bolt.

A shaft penetration 104 through which the shaft penetrates is formed in the center of the tub 10. Tub teeth 105 are formed radially around the entrance in the rear of the shaft penetration 104 of the tub 10. In the washing and rinsing modes, as will be described below, the tub teeth 105 are coupled with the deceleration coupling unit 20, thereby allowing the deceleration coupling unit 20 to decelerate the rotation of the shaft 11. A spring support 106 is formed in a step shape on the inside of the shaft penetration 104, to support an end of a spring 24.

FIG. 5 is an exploded perspective view illustrating the driving apparatus 1 for a washing machine according to the present invention.

As illustrated in FIG. 5, the driving apparatus 1 for a washing machine according to the present invention includes the tub 10, deceleration coupling unit 20, stator assembly 30 and rotor assembly 40. The shaft 11 penetrates the tub 10, and the tub 10 supports the rotation of the shaft 11. The deceleration coupling unit 20 is positioned in a central space 33 of the space assembly 30 and moves frontward or rearward by the lever unit 300. The stator assembly 30 is fixedly coupled to the tub 10. The lever unit 300 is coupled to the stator assembly 30 to move the deceleration coupling unit 20 frontward or rearward. The rotor assembly 40 rotates in the position surrounding the stator assembly 30. The rear portion of the shaft 11 penetrates the rotor assembly 40. The rotor assembly 40 is not fixedly coupled with the shaft 11, but the rotation of the shaft 11 is supported by an end bearing 44 installed in the center of the rotor assembly 40. A fastening means 45 is coupled to the rear end of the shaft 11, thereby preventing separation of the rotor assembly 40 from the rear portion.

The front end of the shaft 11 is a washing tub coupling 111, to which the washing tub (not illustrated) is fixed to rotate the shaft 11 and washing tub together. The rear end of the shaft 11 is a fastener 112 to which the fastening means 45 such as a nut is coupled. The middle portion of the shaft 11 forms a shaft spline 113 arranged in the axial direction, and a coupling stopper 114 is formed in a step shape in front of the shaft spline 113. The deceleration coupling unit 20 is coupled to the shaft spline 113 movably in the axial direction within a limited distance. The coupling stopper 114 may limit frontward movement of the front end of the deceleration coupling unit 20. The front portion of the shaft 11 is rotatably supported by the tub bearing 12, and the rear portion of the shaft 11 is rotatably supported by the end bearing 44 of the rotor assembly 40.

The deceleration coupling unit 20 is spline-coupled with the shaft 11 to be movable frontward or rearward in the axial direction within a limited distance. The deceleration coupling unit 20 is positioned in the central space 33 of the stator assembly 30. The spring 24 is positioned between the spring support 106 stepped inward the shaft penetration 104 of the tub 10 and the front surface of the deceleration coupling unit 20, to apply a force to push the deceleration coupling unit 20 rearward. Accordingly, when the deceleration coupling unit 20 is positioned to the side of the tub 10, the spring 24 is compressed. The detailed structures of the deceleration coupling unit 20, stator assembly 30 and rotor assembly 40 will be described below by referring to each drawing.

FIG. 6 is a front perspective view illustrating the deceleration coupling unit 20 of the driving apparatus 1 for a washing machine according to the present invention, FIG. 7 is a rear perspective view illustrating the deceleration coupling unit 20, and FIG. 8 is an exploded perspective view illustrating the deceleration coupling unit 20.

Referring to FIG. 6 to FIG. 8, the deceleration coupling unit 20 according to the present invention includes a cup-shaped coupling housing 21, a coupling cap 22 coupled to the front of the coupling housing 21 and a carrier 23 received in the coupling housing 21. A sun gear through hole 211 is formed in the center on the rearward bottom surface of the coupling housing 21. A sun gear 432 of the rotor assembly 40 penetrates through the sun gear through hole 211.

A flange 212 protrudes radially around the front end of the coupling housing 21. The deceleration coupling unit 20 is movable frontward by a frontward force applied to the rear portion of the flange 212 by the lever unit 300. The deceleration coupling unit 20 is movable rearward by a compressive force of the spring 24. The coupling cap 22 is coupled to the front of the coupling housing 21. A central hole 221 is formed in the center of the coupling cap 22, through which a shaft receiver 232a of the carrier 23 penetrates. A flange coupling 222 is formed around the coupling cap 22 to fit in the flange 212, and first teeth 223 are formed in the shaft direction from the circumference of the flange coupling 222. The first teeth 223 have a shape to be engaged with the tub teeth 105. Accordingly, when the deceleration coupling unit 20 is positioned to the side of the tub 10 such that the first teeth 223 are engaged with the tub teeth 105, the coupling housing 21 is not rotatable.

An inner gear 213 is formed around the inner wall of the coupling housing 21. The inner gear 213 preferably has a spline shape in the axial direction. The coupling housing 21 rotates together with the carrier 23 in a state where the inner gear 213 is engaged with planetary gears 233 of the carrier 23, or only the carrier 23 rotates in the inner gear 213 in a state where the coupling housing 21 is not rotatable, so as to decelerate the shaft 11.

To this end, the carrier 23 includes a first carrier body 231 of a ring shape, positioned in the rear side, a second carrier body 232 coupled to the front of the first carrier body 231, planetary gears 233 rotatably coupled to the front of the first carrier body 231, and planetary gear shafts 234 fixed to the first carrier body 231 to support the rotation of the planetary gears 233.

A sun gear through hole 231a is formed in the center of the first carrier body 231. The shaft receiver 232a protrudes frontward in the center of the second carrier body 232. Preferably, the shaft receiver 232a is exposed from the front of the central hole 221 of the coupling cap 22. A plurality of supports 232b extending rearward are formed around the second carrier body 232 such that the second carrier body 232 is coupled with the first carrier body 231, and also the planetary gears 233 are exposed from the circumference of the carrier 23. Of course, some or all of the supports 232b may be formed in the second carrier body 232.

A carrier spline 232c is formed in the shaft direction on the inner circumferential surface of the shaft receiver 232a. The carrier spline 232c is engaged with the shaft spline 113 such that the deceleration coupling unit 20 is movable frontward or rearward within a limited distance. The sun gear 432 of the rotor assembly 40 penetrates through the sun gear through hole 211 of the coupling housing 21 and the sun gear through hole 231a of the first carrier body 231, so to be engaged with the inside of the plurality of planetary gears 233. Accordingly, the rotation of the sun gear 432 causes the rotation of the carrier 23 by the planetary gears 233. In the case where the coupling housing 21 is fixed, the planetary gears 233 of the carrier 23 are engaged with the inner gear 213 to rotate, the rotation of the carrier 23 is slower than the rotation of the sun gear 432, and the decelerated rotation is delivered to the shaft 11 through the shaft spline 113 engaged with the carrier spline 232c. In the case where the coupling housing 21 is rotatable, the rotation of the sun gear 432 drives the rotation of the planetary gears 232 and inner gear 213 together, and accordingly, the rotation speed of the shaft 11 through the shaft spline 113 engaged with the carrier spline 232c is the same as the rotation speed of the sun gear 432.

FIG. 5 and FIG. 8 illustrate four planetary gears 233, but the number of planetary gears are not necessarily limited to four. Three, five or six planetary gears may be applied variously according to need.

FIG. 9 is a perspective view illustrating the stator assembly 30 of the driving apparatus 1 for a washing machine according to the present invention.

Referring to FIG. 9 along with FIG. 5, the stator assembly 30 according to the present invention includes an insulator 31 surrounding a stator core (not illustrated). A lever unit coupling 32 is positioned in the center of the insulator 31. The central space 33 denotes an empty space in the center of the stator assembly 30, and the deceleration coupling unit 20 is positioned in the space. The lever unit 300 coupled to the lever unit coupling 32 is operated to push the deceleration coupling unit 20 frontward. The arranging protrusion 103a of the tub 10 is inserted in the arranging hole 34, and the coupling hole 35 is positioned to communicate with the coupling hole 103b, allowing a bolt, etc. to be coupled thereto.

The lever unit 300 includes a lever holder 310, a first lever 320 and a second lever 330. The lever holder 310 is fixed to the lever unit coupling 32 in the insulator 31 of the stator assembly 30. The first lever 320 and second lever 330 are rotatably hinged to the lever holder 310, rotate within a predetermined range, and communicate with each other, as will be described below.

FIG. 10 is a side view illustrating the principle of operating the lever unit 300 of the driving apparatus 1 for a washing machine according to the present invention.

As illustrated in FIG. 10, the lever unit 300 according to the present invention includes the lever holder 310 fixed to the lever unit coupling 32 of the insulator 31, the first lever 320 hinged to the front side of the lever holder 310 and the second lever 330 hinged to the rear side of the lever holder 310.

The first lever 320 is hinged to the lever holder 310 by a first hinge 321. Likewise, the second lever 330 is hinged to the lever holder 310 by a second hinge 331. When a lever operator 323 of the first lever 320 operates from position A to position B, the first lever 320 rotates by the first hinge 321, and a contact 322 in the rear side of the first lever 320 also rotates. When the contact 322 rotates and pushes a contact surface 333 of the second lever 330, the second lever 330 rotates with respect to the second hinge 331, and a lift 332 of the second lever 330 moves from position A' to position B'. By operation of the first lever 320 and second lever 330, the deceleration coupling unit 20 moves rearward from frontward to be positioned. The lift 332 preferably has a U-shape when viewed from the front.

FIG. 11 is a side view illustrating the operation of the lever unit 300 and deceleration coupling unit 20 of the driving apparatus 1 for a washing machine according to the present invention in a washing or rinsing mode, and FIG. 12 is a side view illustrating the operation in a dewatering mode.

FIG. 11 illustrates the structure when the first lever 320 and second lever 330 in FIG. 10 are in positions A and A', respectively. In FIG. 11, the lift 332 of the second lever 330 presses the flange 212 of the deceleration coupling unit 20 to push the deceleration coupling unit 20 frontward. In this state, the spring 24 is compressed between the spring support 106 of the tub 10 and the coupling cap 22 of the deceleration coupling unit 20. FIG. 11 shows the state in the washing or rinsing mode. When the operation is switched to the dewatering mode, the state is transferred to a state as illustrated in FIG. 12.

Specifically, FIG. 12 illustrates the structure when the first lever 320 and second lever 330 are in positions B and B', respectively, by operation of the lever unit 300. In FIG. 12, the lift 332 of the second lever 330 moves rearward from the flange 212 of the deceleration coupling unit 20, and the deceleration coupling unit 20 moves rearward by the compressive force of the spring 24 compressed in the washing or rinsing mode. FIG. 12 shows the state in the dewatering mode.

FIG. 13 is a perspective view illustrating the rotor assembly 40 of the driving apparatus 1 for a washing machine according to the present invention, and FIG. 14 is a cross-sectional view.

As illustrated in FIG. 13 and FIG. 14, the rotor assembly 40 according to the present invention includes a cup-shaped rotor housing 41, a plurality of magnets 42 attached to the inner wall of the rotor housing 41, and a sun gear unit 43 formed in the center of the rotor housing 41.

The sun gear unit 43 is illustrated in FIG. 5 as a member independent from the rotor housing 41, but is not necessarily limited to such form. The sun gear unit 43 may be manufactured as a molded article integrated with the rotor housing 41 by locating the rotor housing 41 in an injection mold.

The sun gear unit 43 includes a main body 431, a sun gear 432 and a shaft penetration 433. The main body 431 is fixedly positioned in the center of the rotor housing 41, rotating integrally with the rotor housing 41. The end bearing 44 is inserted in the rear of the main body 431 thereinside. The shaft penetration 433 is formed in the center of the sun gear 432. The shaft 11 penetrates through the shaft penetration 433 and is rotatably supported by the end bearing 44. Thanks to such a structure, the torque is not transmitted directly to the shaft 11 when the rotor housing 41 rotates. The rotor housing 41 and shaft 11 are coupled to each other to rotate independently. The rotation of the rotor housing 41 causes the rotation of the sun gear 432, and the rotation of the sun gear 432 causes the rotation of the carrier 23. Accordingly, the shaft 11 spline-coupled with the carrier 23 rotates by rotation of the carrier 23. The independent coupling between the rotor housing 41 and shaft 11 allows the rotation speed of the shaft 11 to decelerate with respect to the rotation speed of the rotor housing 41.

The sun gear 432 has an outer shape to be engaged with the inside of the plurality of planetary gears 233 installed in the carrier 23 of the deceleration coupling unit 20. The fastening means 45, components such as a washer or nut, is coupled to the rear end of the shaft 11, thereby preventing the end bearing 44 from being pushed rearward and the shaft 11 from being moved frontward.

Rotor teeth 46 are formed in the center of the rotor housing 41 and around the sun gear 432. The rotor teeth 46 are engaged with second teeth 214 of the deceleration coupling unit 20 when the deceleration coupling unit 20 moves rearward. When the rotor housing 41 rotates while the rotor teeth 46 and second teeth 214 are engaged with each other, the deceleration coupling unit 20 rotates accordingly.

FIG. 15 is a cross-sectional view illustrating the structure when the driving apparatus 1 for a washing machine according to the present invention operates in a washing or rinsing mode.

Referring to FIG. 15, in the washing or rinsing mode, in the driving apparatus 1 for a washing machine according to the present invention, the first lever 320 of the lever unit 300 operates such that the second lever 330 moves the deceleration coupling unit 20 frontward. Here, the spring 24 is compressed, and the first teeth 223 formed in the coupling cap 22 of the deceleration coupling unit 20 are brought into engagement with the tub teeth 105 formed in the tub 10.

In this state, when power is applied to the stator assembly 30 to rotate the rotor housing 41 of the rotor assembly 40, the sun gear 432 of the sun gear unit 43 rotates together, and the plurality of planetary gears 233 engaged with the sun gear 432 rotate. The coupling housing 21 coupled with the coupling cap 22 is forced not to rotate. Accordingly, the carrier 23 rotates at a decelerated speed in the coupling housing 21. Since the carrier spline 232c formed on the inside of the shaft receiver 232a of the carrier 23 is engaged with the shaft spline 113, the decelerated rotation of the carrier 23 is intactly delivered to the rotation of the shaft 11. The decelerated rotation of the shaft 11 causes the decelerated rotation of the washing tub (not illustrated) coupled to the front of the shaft 11. Accordingly, the washing and rinsing modes are performed at a low speed.

FIG. 16 is a cross-sectional view illustrating the structure when the driving apparatus 1 for a washing machine according to the present invention operates in a dewatering mode.

As illustrated in FIG. 16, when the operation is switched to the dewatering mode, the first lever 320 of the lever unit 300 operates in the arrow direction such that the lift 332 of the second lever 330 rotates rearward. Here, the spring 24 compressed pushes the deceleration coupling unit 20 rearward. The coupling cap 22 engaged with the tub teeth 105 of the tub 10 is separated therefrom. The coupling housing 21 moves rearward such that the second teeth 214 formed in the coupling housing 21 are engaged with the rotor teeth 46 formed in the center of the rotor housing 41. Of course, a structure where the lift 332 of the second lever 330 is coupled with the coupling housing 21 without the spring 24 for movement can be considered.

In this state, when power is applied to the stator assembly 30 to rotate the rotor housing 41 of the rotor assembly 40, the sun gear 432 of the sun gear unit 43 rotates together, and the plurality of planetary gears 233 engaged with the sun gear 432 rotate. Since the second teeth 214 of the coupling housing 21 are engaged with the rotor teeth 46 of the rotor housing 41, the rotation of the rotor housing 41 directly causes the rotation of the coupling housing 21.

Accordingly, the carrier 23, coupling housing 21 and rotor housing 41 rotate at the same speed. Since the carrier spline 232c formed on the inside of the shaft receiver 232a of the carrier 23 is engaged with the shaft spline 113, the rotation of the carrier 23 is intactly delivered to the rotation of the shaft 11. Accordingly, the rotation speed of the rotor housing 41 is the same as the rotation speed of the shaft 11. The washing tub (not illustrated) coupled to the front of the shaft 11 also rotates at the same speed as the rotor housing 41. Accordingly, the dewatering mode is performed at a high speed.

The detailed description of the present invention described as above simply explains examples for understanding the present invention, but does not intend to limit the scope of the present invention. The scope of the present invention is determined by the accompanying claims. Additionally, it should be construed that a simple modification or change falls under the protection scope of the present invention.

The invention claimed is:

1. A driving apparatus for a washing machine, comprising:
 a tub;
 a stator assembly coupled to the tub; and
 a rotor assembly positioned outside the stator assembly,
 the apparatus further comprising a deceleration coupling unit positioned in a central space of the stator assembly,
 wherein the deceleration coupling unit comprises a carrier, wherein the carrier has a plurality of planetary gears installed therein and comprises a shaft receiver having a carrier spline on the inside,
 wherein the deceleration coupling unit further comprises a coupling housing receiving the carrier inside and having an inner gear engaged with the outer portions of the plurality of planetary gears, and
 wherein a lever unit is coupled to an insulator of the stator assembly such that the lever unit moves the coupling housing frontward or rearward.

2. The driving apparatus for a washing machine according to claim 1, further comprising a shaft penetrating the carrier and the rotor assembly, wherein the shaft has a shaft spline formed in a position fitting into the carrier spline.

3. The driving apparatus for a washing machine according to claim 2, wherein the shaft penetrates through a shaft penetration of a sun gear protruding frontward in the rotor assembly.

4. The driving apparatus for a washing machine according to claim 3, wherein the sun gear has an outer shape to be engaged with the inner portions of the plurality of planetary gears.

5. A driving apparatus for a washing machine, comprising:
 a tub;
 a stator assembly coupled to the tub; and a rotor assembly positioned outside the stator assembly,
 the apparatus further comprising a deceleration coupling unit positioned in a central space of the stator assembly,
 wherein the deceleration coupling unit is movable frontward or rearward in the tub and rotor assembly, and
 the deceleration coupling unit decelerates the rotation of a shaft penetrating the tub in a washing mode.

6. The driving apparatus for a washing machine according to claim 5, wherein the deceleration coupling unit comprises a carrier, wherein the carrier has a plurality of planetary gears installed therein and comprises a shaft receiver having a carrier spline on the inside.

7. The driving apparatus for a washing machine according to claim 6, wherein the deceleration coupling unit further comprises a coupling housing receiving the carrier inside and having an inner gear engaged with the outer portions of the plurality of planetary gears.

8. The driving apparatus for a washing machine according to claim 7, wherein a lever unit is coupled to an insulator of the stator assembly such that the lever unit moves the coupling housing frontward or rearward.

9. The driving apparatus for a washing machine according to claim 5, wherein the shaft penetrates a shaft penetration of a sun gear protruding frontward in the rotor assembly.

* * * * *